United States Patent [19]

Sims, Jr.

[11] 3,790,055

[45] Feb. 5, 1974

[54] MOTION CONTROL DEVICE

[75] Inventor: John C. Sims, Jr., Sudbury, Mass.

[73] Assignee: New England Research Associates, Inc., Bedford, Mass.

[22] Filed: Jan. 11, 1973

[21] Appl. No.: 322,808

[52] U.S. Cl. .................... 226/174, 226/39, 226/154, 226/181, 226/195

[51] Int. Cl. .................... B65h 17/44

[58] Field of Search ... 226/154, 155, 174, 181, 186, 226/187, 195, 190, 194, 39

[56] References Cited

UNITED STATES PATENTS

| | | | |
|---|---|---|---|
| 3,419,686 | 12/1968 | Rhoades | 226/188 X |
| 3,700,152 | 10/1972 | Warren | 226/174 X |

*Primary Examiner*—Richard A. Schacher
*Attorney, Agent, or Firm*—Francis C. Browne et al.

[57] ABSTRACT

A clutch or motion control device for quickly controlling with great accuracy the motion of the tape in a cassette when inserted in a cassette player-recorder unit. The device is a hollow, elongated member mounted for rotation about its longitudinal axis in the cassette adjacent the tape such that the driving capstan of the cassette player-recorder unit is retained within the cavity of the hollow member. A portion of the sidewall of the hollow member is cut away to expose the cavity and bring the tape into contact with the driving capstan when the hollow member is in one rotative position. In a second rotative position, the boundry of the unremoved sidewall portion of the hollow member separates the tape from the rotating capstan.

5 Claims, 6 Drawing Figures

MOTION CONTROL DEVICE

BACKGROUND OF THE INVENTION

This invention relates to a device for stopping and starting the motion of the tape of a cassette and more particularly to a rotatable motion control device which allows the tape to be driven when the device is appropriately positioned, and then immediately halted when the device is rotated from that position.

A number of commercially available recording and reproducing devices are constructed to accept a flexible magnetic record web, commonly known as a tape and hereinafter so designated, incorporated within a cassette record unit, hereinafter referred to simply as a cassette. The tape is wound upon a take-up reel and a supply reel which are contained within the cassette, the take-up and supply reels being interchangeably so designated depending on the desired direction the tape is to be driven. When the cassette is inserted within a cassette player-recorder unit, a drive capstan intrudes within the cassette, adjacent to the tape, and drive means engage the take-up and supply reels. To propel the tape, a drive member, usually a flexible wheel, presses the tape against the capstan, thus effecting a constant movement of the tape across recording or reproducing transducers.

To prevent a piling up of the tape between the capstan and the take-up reel, the take-up reel is rotated by a suitable means at a rate sufficient to accept the tape as it passes the drive capstan. This means usually consists of a constant speed motor connected to the take-up reel by a clutch which has an inherent slippage to accommodate variations between the take-up reel and motor speeds.

In the data processing field, extremely fast and reliable starting and stopping times for the tape are a necessity. Information is located on the tape in the form of a particular pattern of the magnetizable particles in the tape coating composition in a particular section of the tape, or the absence thereof. These bits, as they are commonly known, are closely spaced on a tape, and detected or added and deleted by a transducer or like device. It is essential that when a tape is to be halted, it is quickly stopped between the bits. The faster the tape is started and stopped, the closer the bits may be located without compromising accuracy.

Devices for halting the motion of the tape are well known in the prior art. Such devices commonly apply a braking action to the motor or some other rotating part of the apparatus, or halt the motor by de-energization. However, due to the mass of the motor and rotating parts of the apparatus, the time of stopping and starting the tape will usually be much greater than desired, especially when the tape is to be used in a data processing environment. Attempts to reduce the start-stop time have resulted in substantially increased equipment complexity with correspondingly increased cost, but with minimal success in reduction of the start-stop time.

The present invention overcomes the above-mentioned undesirable aspects of the prior art by providing an improved braking device for a cassette wherein only the inertia of a roller pressing the tape against the drive capstan and that of the tape passing the capstan need be overcome to halt motion of the tape. Due to the low mass of both the roller and tape, this provides a very fast and reliable stopping and starting time for the tape which is equal or superior to that of commercially available reel-to-reel tape data processing equipment.

Accordingly, it is a primary object of this invention to provide an improved starting and stopping time for a tape.

It is another object of this invention to provide an apparatus which needs to overcome a minimum of inertia to start or stop a tape.

It is a further object of this invention to furnish an apparatus providing an improved starting and stopping time for a tape which eliminates the need of braking elements on the motor or rotational components of a tape recording and reproducing device.

These and further objects which will become clear in the following detailed description of the invention are accomplished by providing a hollow, elongated motion control device, longitudinally excised on one sidewall, which is incorporated in the capstan-accommodating hole of a cassette adjacent the tape contained therein such that the driving capstan of a cassette player-recorder unit is retained within the hollow cavity of the device when the cassette is inserted within a cassette player-recorder unit. The tape contacts the driving capstan when the device is in a first rotative position. In a second rotative position, a face of the unremoved sidewall portion of the device separates the tape from the rotating capstan, thereby effecting a tape motion halt.

Further details of this invention will be clear from the following description and appended claims taken in conjunction with the accompanying drawing in which is illustrated a preferred embodiment of the invention.

DETAILED DESCRIPTION OF THE INVENTION

Figure 1:
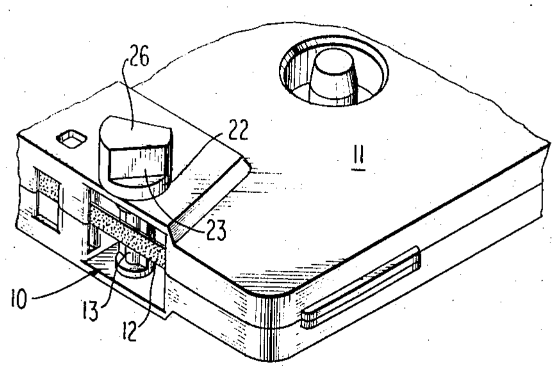
FIG. 1 is a perspective view of a portion of a cassette employing the motion control device of the invention.

Referring now to FIG. 1, the motion control device 10 is rotatably mounted within the cassette 11 to extend across the cassette adjacent to the tape 12 with the cassette drive capstan 13 extending into the hollow interior cavity of the device 10 and an integral extension 22 of the device lying above a face of the cassette.

Figure 4:
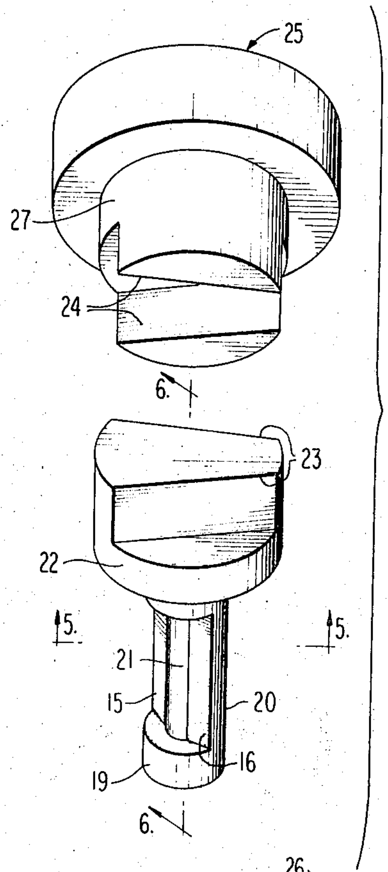
FIG. 4 is a schematic illustration showing the motion control device and its rotatable control means.
Figure 5:
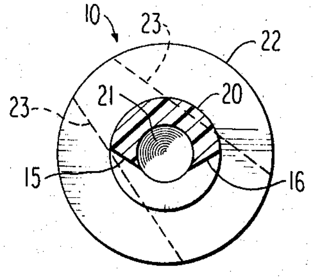
FIG. 5 is a view along section 5—5 of FIG. 4.
Figure 6:
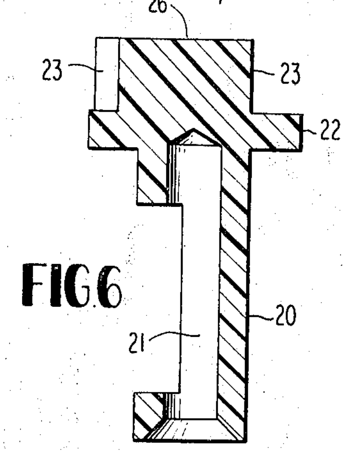
FIG. 6 is a view along section 6—6 of FIG. 4.

Referring to FIGS. 4, 5 and 6, the motion control device 10 comprises a hollow elongated member 19 with a central cavity 21 extending from one end partially into the member 19 formed from a cylinder of which a portion of the sidewall 20 is cut away to expose the cavity 21, with the radial boundaries of the cut away portion of the sidewall defined by oppositely located boundary walls or faces 15, 16. An integral protrusion 22 extending axially from an end of the member 19 is partially excised to form a triangularly tapered knob 26 defined between walls 23. A rotatable control 25 mounted in the cassette player-recorder unit (not illustrated) has a lower portion 27 across which a triangularly tapered groove extends defined by sidewalls 24, which groove is complementary in shape to the knob 26 which engagingly fits therein.

Figure 2:
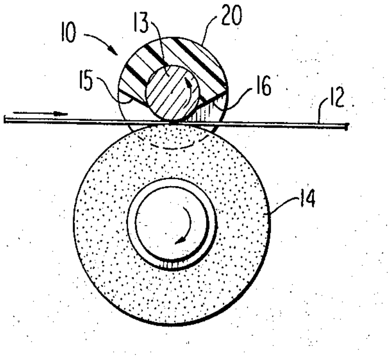
FIG. 2 is a cross sectional view of the motion control device in the driving position.

As illustrated in FIG. 2, driving capstan 13 of the player-recorder unit fits within and is freely rotatable within the cavity 21 of the elongated member 19. A pressure member 14, a wheel or other suitable device, resiliently mounted in the player-recorder unit is located contiguous to tape 12 directly opposite the driving capstan 13 when the cassette is inserted in the player-recorder unit and presses the tape 12 against the driving capstan 13 when the control device is in the drive position illustrated in FIG. 2. When the control device 10 is rotated to the braking position shown in FIG. 3, the radially extending face 15 of the sidewall of the control device contacts the tape 12 and resiliently mounted wheel 14 to remove the tape from contact with the driving capstan 13. A boundary wall 15 forms an acute angle with a radial extending from the axis of the driving capstan 13 so that the full face of the boundary wall 15 initially contacts the tape when the member 19 is rotated from the driving position of FIG. 2 to the braking position of FIG. 3 and brings pressure to bear on the pressure element 14 to move the pressure element and tape away from the driving capstan 13. This avoids point pressure on the tape which might damage the tape.

Looking now to the functional aspects of the motion control device 10, cassette 11 incorporates motion control device 10 within a capstan-accommodating hole, adjacent tape 12. When cassette 11 is inserted into a cassette player-recorder unit, not shown in the instant drawing, capstan 13 extends into the cavity 21 of the elongated member 19 of the control device. In the driving position shown in FIG. 2, driving capstan 13 engages tape 12, which is in turn pressed against capstan 13 by resilient pressure member 14. Tape 12 is, therefore, driven at the surface speed of driving capstan 13.

To halt the motion of tape 12, motion control device 10 is rotated approximately 45°, whereby pressure from the boundary wall 15 of the control device moves the tape 12 and resilient member 14 away from the driving capstan 13 and disengages the tape 12 from contact with the capstan 13 to immediately halt the tape. A reverse rotation of approximately 45° will return the apparatus to the driving position of FIG. 2.

Figure 3:
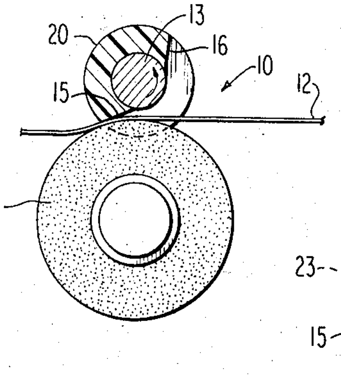
FIG. 3 is a cross sectional view of the motion control device in the braking position.

The rotatable control 25 of the player-recorder unit, which engages the knob 26 on the end of the protrusion 22 when the cassette is inserted within the cassette player-recorder unit, serves two functions. First, when cassette 11 is being inserted within the cassette player-recorder unit, if motion control device 10 is not properly aligned within cassette 11, the knob 26 of the protrusion 22 will not seat in the groove 24 of the rotatable control 25. Cassette 11 cannot seat within the cassette player-recorder unit until motion control device 10 is properly aligned. Secondly, the rotatable control 25 serves to rotate the elongated member 19 into one of two positions as shown in FIG. 2 and FIG. 3. Appropriate controls on the player-recorder unit, not shown, rotate actuator 25 into one of the two positions so that tape 12 is driven by drive capstan 13 or is forced out of contact with the driving capstan by the boundary wall of the control device.

In view of the foregoing, it should be appreciated that the novel configuration in the structure of a motion control device as embodied in the present invention has substantially eliminated persisting problems in the art by providing a simple apparatus which greatly decreases the time necessary to halt the motion of a flexible web record member.

It should be obvious to one skilled in the art that the invention may be embodied in other specific forms without departing from the spirit or essential characteristics thereof. The present embodiment is, therefore, to be considered in all respects as illustrative and not restrictive. The scope of the invention is indicated by the appended claims rather than the foregoing description, and all changes which come within the meaning and intent of the claims will, therefore, not depart from the true spirit and scope of the invention.

What is claimed as new and is desired to be secured by United States letters Patent is:

1. A device for controlling the motion of the tape of a cassette insertable into a cassette player-recorder unit having a rotatable capstan for driving the tape of the inserted cassette comprising an elongated member having a longitudinally extending cavity into which the capstan of a player-recorder unit is insertable for free rotation, a portion of the sidewall of said member defined between said cavity and the member exterior surface being cut away to expose said cavity, means for rotatably mounting said member in the cassette with the longitudinal axis of said cavity extending transversely of and to one side of the tape with the member being rotatable about said longitudinal axis between (1) a driving position in which the exposed portion of said cavity faces the tape placing the capstan of the player-recorder unit into which the cassette is inserted in driving contact with the tape and (2) a braking position in which an unremoved portion of the sidewall of said member in contact with the tape separates the tape from contact with the capstan, and means integral with said member for engaging a rotatable control on the player-recorder unit for rotating said member selectively to either said driving position or said braking position.

2. The device of claim 1 wherein the player-recorder unit has a pressure unit resiliently mounted adjacent the driving capstan in contact with a face of the tape of an inserted cassette opposite the face adjacent the capstan pressing the tape against the capstan when said member is in the driving position and said member sidewall portion is configured to smoothly contact a length of the tape opposite the face contacted by the pressure unit and move the tape and pressure unit away from the driving capstan when in said braking position.

3. The device of claim 2 wherein the unremoved sidewall portion of said member contacting the tape is defined by a plane extending transversely of the sidewall of said member at an acute angle to a radial from the central axis of said cavity passing through the intersection of said plane and the cavity wall.

4. The device of claim 2 wherein said integral engaging means comprises an extension of said member protruding above the face of the cassette with the end of said extension shaped to matingly engage a complementary shape on the player-recorder unit rotatable control.

5. In a cassette insertible into a player-recorder unit having a rotatable capstan for driving magnetic tape stored on rotatable drums in the cassette and having a pressure member mounted for resiliently pressing the tape of the inserted cassette into contact with the capstan, the improvement of a hollow, elongated control member having a cavity extending partially along its length from one end and into which cavity the capstan fits for free rotation, that portion of said member containing the cavity being formed from a hollow cylinder in which a portion of the sidewall along one side is cut away to expose the cavity, each face of the unremoved sidewall portion extending longitudinally of the elongated member being a planar surface extending across the sidewall at an acute angle to a radial from the longitudinal axis of said cavity, and means for mounting said member of an inserted cassette for rotation about the longitudinal axis of said cavity between (1) a driving position in which the exposed portion of the cavity faces the pressure member with the pressure unit pressing the tape into contact with the driving capstan and (2) a braking position in which one of said sidewall faces is moved against the tape to force the tape and pressure member away from the driving capstan, the other end of said elongated member having an integral portion extending above the face of said cassette and shaped to matingly engage a complementarily shaped control rotatably mounted in the player-recorder unit.

* * * * *